July 22, 1952 E. T. BUTCHER 2,604,292
CONTROL UNIT FOR IRRIGATION VALVES
Filed Sept. 16, 1948

INVENTOR
Eugene T. Butcher
BY
ATTORNEYS

Patented July 22, 1952

2,604,292

UNITED STATES PATENT OFFICE 2,604,292

CONTROL UNIT FOR IRRIGATION VALVES

Eugene T. Butcher, Waterford, Calif.

Application September 16, 1948, Serial No. 49,556

1 Claim. (Cl. 251—55)

This invention is directed to, and it is an object to provide, a novel control unit for actuating irrigation valves; the control unit being of manually operated, screw type.

In conventional, screw type control units for irrigation valves, the screw is exposed and, in time, becomes rusty and dirt clogged, preventing ready opening or closing of the valve.

It is therefore another object of this invention to provide a screw type control unit, for irrigation valves, wherein the screw is wholly enclosed in a protective telescopic casing and runs in an oil bath; thus remaining clean and free running at all times.

Another object of the invention is to provide a control unit, as above, which includes a novel structural assembly, including telescopic sleeves, within which the screw is disposed in protected relation.

A further object of the invention is to provide a control unit which is designed for ease and economy of manufacture, and assembly.

An additional object of the invention is to provide a control unit which is adapted for use on both horizontal and vertical type irrigation valves.

A further object of the invention is to provide a practical and reliable control unit for irrigation valves, and one which will be exceedingly effective for the purpose for which it is designed.

These objects are accomplished by means of such structure and relative arrangement of parts as will fully appear by a perusal of the following specification and claim.

Figure 1:
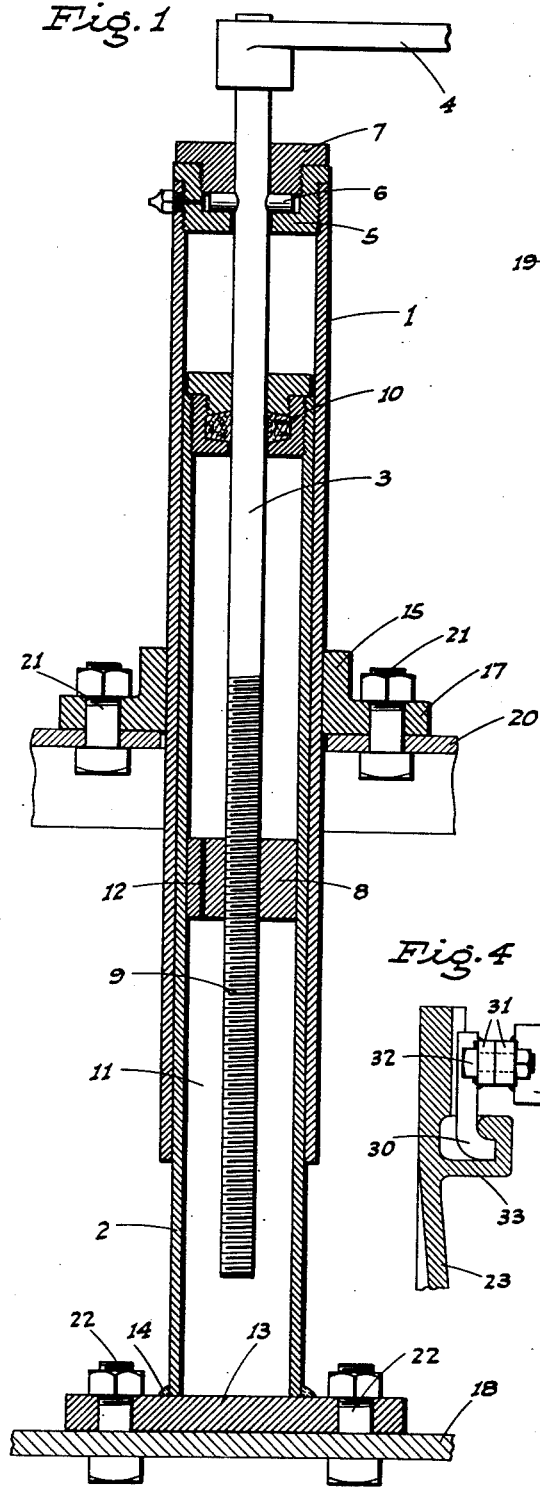
Fig. 1 is a sectional elevation of the control unit.
Figure 2:
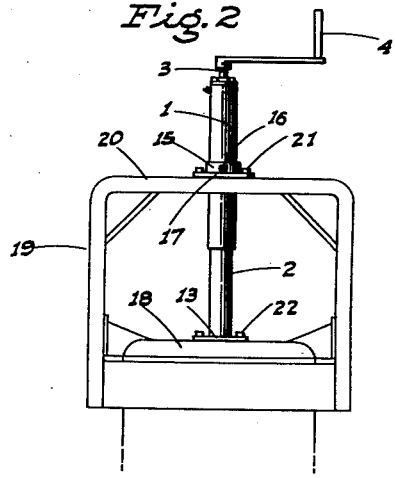
Fig. 2 is an elevation of the control unit as applied to a horizontal valve.

Referring now more particularly to the characters of reference on the drawings, and at present to Figs. 1 and 2, the control unit, for irrigation valves, comprises a pair of sleeves in telescopic relation; there being an upper sleeve, indicated at 1, and a lower sleeve, indicated at 2.

The upper sleeve 1 is engaged about the lower sleeve 2, and the extent of overlap between said sleeves is substantial.

The assembly of the upper sleeve 1 and lower sleeve 2 is disposed vertical, and a vertical spindle or screw shaft 3 extends axially within said assembly, and projects out of the upper end thereof; there being a horizontal hand crank 4 fixed on the upper end of said shaft 3.

At its top end the upper sleeve 1 is fitted with a threaded-in recessed bushing 5 which forms a seat for a cross pin 6 on the shaft 3; the bushing 5 including a threaded-in retaining nut 7 which prevents upward displacement of the cross pin 6 from the bushing 5, but does not limit rotation of said cross pin with the shaft. It is thus possible to freely rotate the shaft 3 by means of the hand crank 4.

A nut 8 is secured in the lower sleeve 2, intermediate its ends, as by welding or the like, and the shaft 3 is threaded, as at 9, and runs through the nut 8. It will thus be evident that upon rotation of the shaft 3, with resultant turning of said shaft in the nut 8, there will be relative extension or contraction of the sleeve assembly.

A packing unit 10 is threaded into the top end of the lower sleeve 2, and the shaft 3 runs through such packing unit 10 in oil-tight but free turning relation.

The inside of the lower sleeve 2 below the packing unit 10 forms an oil chamber 11, part of which is above and part of which is below the nut 8; there being an oil passage 12 through said nut to provide intercommunication between said portions of the chamber 11. The oil chamber 11 is substantially full of oil.

At its bottom end the lower sleeve 2 is closed by a horizontal base or attachment flange 13 secured to said sleeve by welding, as at 14. Such horizontal base or attachment flange 13 is of substantially greater diameter than that of the lower sleeve 2.

Intermediate its ends the upper sleeve 1 is fitted with a collar 15 adjustably secured to said sleeve as by a set screw 16. The collar 15 includes a radial attachment flange 17.

The above described control unit is shown, in Figs. 1 and 2, as used in connection with an irrigation valve which includes a horizontal valve plate 18 vertically slidably mounted in an inverted, U-shaped guide frame 19 which includes a horizontal top bar 20.

The upper sleeve 1 extends, intermediate its ends, through an opening in the top bar 20, and the radial attachment flange 17 is secured to said top bar 20 by bolts 21.

The horizontal, base or attachment flange 13 abuts against, and is secured to, the top of the horizontal valve plate 18 by bolts 22. Thus, upon rotation of the hand crank 4 in one direction or the other, the shaft 3, acting on the nut 8, causes the lower sleeve 2 to raise or lower, to open or close the valve plate 18, respectively.

As the shaft 3 and nut 8 are wholly enclosed within the protective casing formed by the assembly of the sleeves 1 and 2, and other attached parts, such shaft is not subject to rusting or clogging with dust and dirt; remaining free running at all times. This free running of the shaft 3 is further enhanced by virtue of the fact that the threaded working parts thereof are in an oil bath at all times.

Another advantage of the control unit is that the horizontal hand crank 4 remains in the same horizontal plane rather than raising or lowering, when the valve is adjusted, as in conventional irrigation valves.

Figure 3:
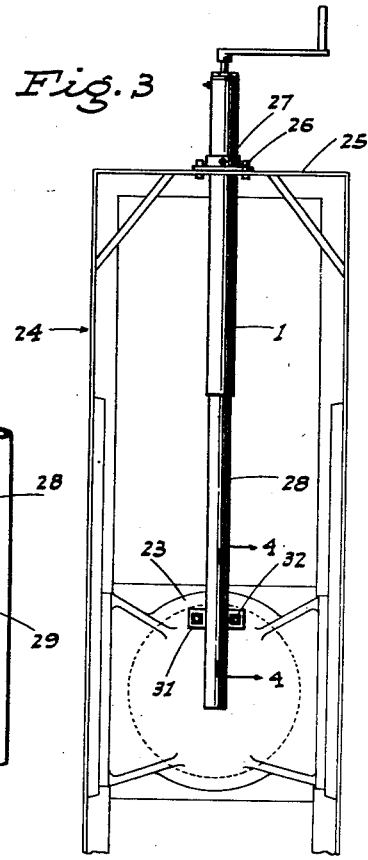
Fig. 3 is an elevation of the control unit as applied to a vertical valve.
Figure 4:
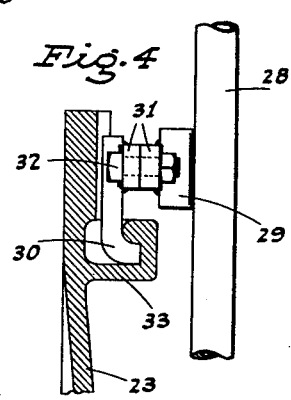
Fig. 4 is an enlarged fragmentary section on line 4—4 of Fig. 3.

In Figs. 3 and 4, the control unit is shown as used in connection with an irrigation valve of the type which includes a vertical valve plate 23 guided, for vertical sliding motion, in an elongated upstanding frame 24 of inverted U-shape, which frame includes a top bar 25.

Here the control unit is constructed in the same manner as in Fig. 1, except that it is somewhat elongated vertically. The adjustable attachment flange 26 of the collar 27 is secured to the top bar 25 just as in the embodiment of Figs. 1 and 2.

However, the manner of attaching the lower sleeve 28 to the vertical valve plate 23 is as follows:

The lower sleeve 28 has a block 29 affixed thereon, and such block is secured to a suspension hook 30 by a pair of initially separate, transverse attachment bars 31 removably secured together by cross bolts 32. The suspension hook 30 engages, in normally holding relation, in a receiving boss 33 on the face of the vertical valve plate 23.

In this embodiment the control unit functions to raise or lower the vertical valve plate 23 in the same manner as described with respect to Figs. 1 and 2; to-wit rotation of the hand crank 4 causes the lower sleeve 28 to raise or lower, dependent upon the direction of rotation.

The described control unit, as applied to either a horizontal or vertical valve plate type irrigation valve, is a practical and reliable device, capable of being hand-operated easily at all times. Further, by reason of the enclosure of the working parts, they are long lived and not subject to rusting or clogging by dirt; there being nothing requiring servicing or maintenance, except possibly the application of lubricant to the chamber 11 at infrequent periods.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In an irrigation valve which includes a frame having a top cross member, and a vertically movable valve plate below said member; a control unit for the plate comprising a tubular member closed at its lower end, upstanding from and secured on the valve plate, a sleeve slidably fitted on the tubular member and projecting thereabove, means securing the sleeve on the cross member of the frame against movement relative thereto, a screw extending into the sleeve from an upper termination above the upper end of the sleeve for operational access, means between the screw and sleeve at the upper end of the latter rotatably mounting the screw against axial movement, and a nut secured in the tubular member intermediate its ends and through which the screw is threaded; there being a lubricant passage from above to below the nut, means closing the tubular member at its upper end whereby said member forms a lubricant retaining chamber.

EUGENE T. BUTCHER.

REFERENCES CITED

The following references are of record in the file of this patent:

UNITED STATES PATENTS

| Number | Name | Date |
| --- | --- | --- |
| 580,930 | Cook | Apr. 20, 1897 |
| 696,901 | Fairchild | Apr. 1, 1902 |
| 1,301,030 | Benner | Apr. 15, 1919 |
| 1,540,539 | Cain | June 2, 1925 |
| 1,578,349 | Nixon | Mar. 30, 1926 |
| 1,717,392 | Lofton | June 18, 1929 |
| 1,754,138 | Agee | Apr. 8, 1930 |
| 1,832,528 | Buck | Nov. 17, 1931 |
| 1,841,789 | Connolly | Jan. 19, 1932 |
| 1,872,211 | Yarnall | Aug. 16, 1932 |
| 2,029,837 | Schmid | Feb. 4, 1936 |
| 2,417,901 | Bagsar | Mar. 25, 1947 |
| 2,424,492 | Morris | July 22, 1947 |

FOREIGN PATENTS

| Number | Country | Date |
| --- | --- | --- |
| 42,966 | Switzerland | Apr. 18, 1909 |